United States Patent [19]

Bilz

[11] 4,090,802
[45] May 23, 1978

[54] RADIO DETECTOR FOR DETECTING DULL AND BROKEN TOOLS

[75] Inventor: Reiner Bilz, Stuttgart, Germany
[73] Assignee: Otto Bilz Werkzeugfabrik, Germany
[21] Appl. No.: 754,367
[22] Filed: Dec. 27, 1976
[51] Int. Cl.² .................................... B23B 49/00
[52] U.S. Cl. .................................. 408/6; 408/9; 408/11; 408/16
[58] Field of Search ............... 408/6, 16, 9, 11, 710, 408/711

[56] References Cited
U.S. PATENT DOCUMENTS

| 3,381,550 | 5/1968 | Smith | 408/710 X |
| 3,652,099 | 3/1972 | Bilz | 408/16 |
| 3,723,017 | 3/1973 | Bilz et al. | 408/16 |
| 3,990,805 | 11/1976 | Duchrohet | 408/6 |

Primary Examiner—Leonidas Vlachos
Attorney, Agent, or Firm—Hill, Gross, Simpson, Van Santen, Steadman, Chiara & Simpson

[57] ABSTRACT

A chuck unit for boring, drilling or cutting tools having a safety clutch so as to prevent overload resulting from broken or dull tools and wherein when the clutch is actuated by an overload a transmitter in the tool support is actuated to radiate a signal which is detected by a receiver so as to indicate the malfunction and/or stop the tool so as to prevent damage to the tool or workpiece.

10 Claims, 6 Drawing Figures

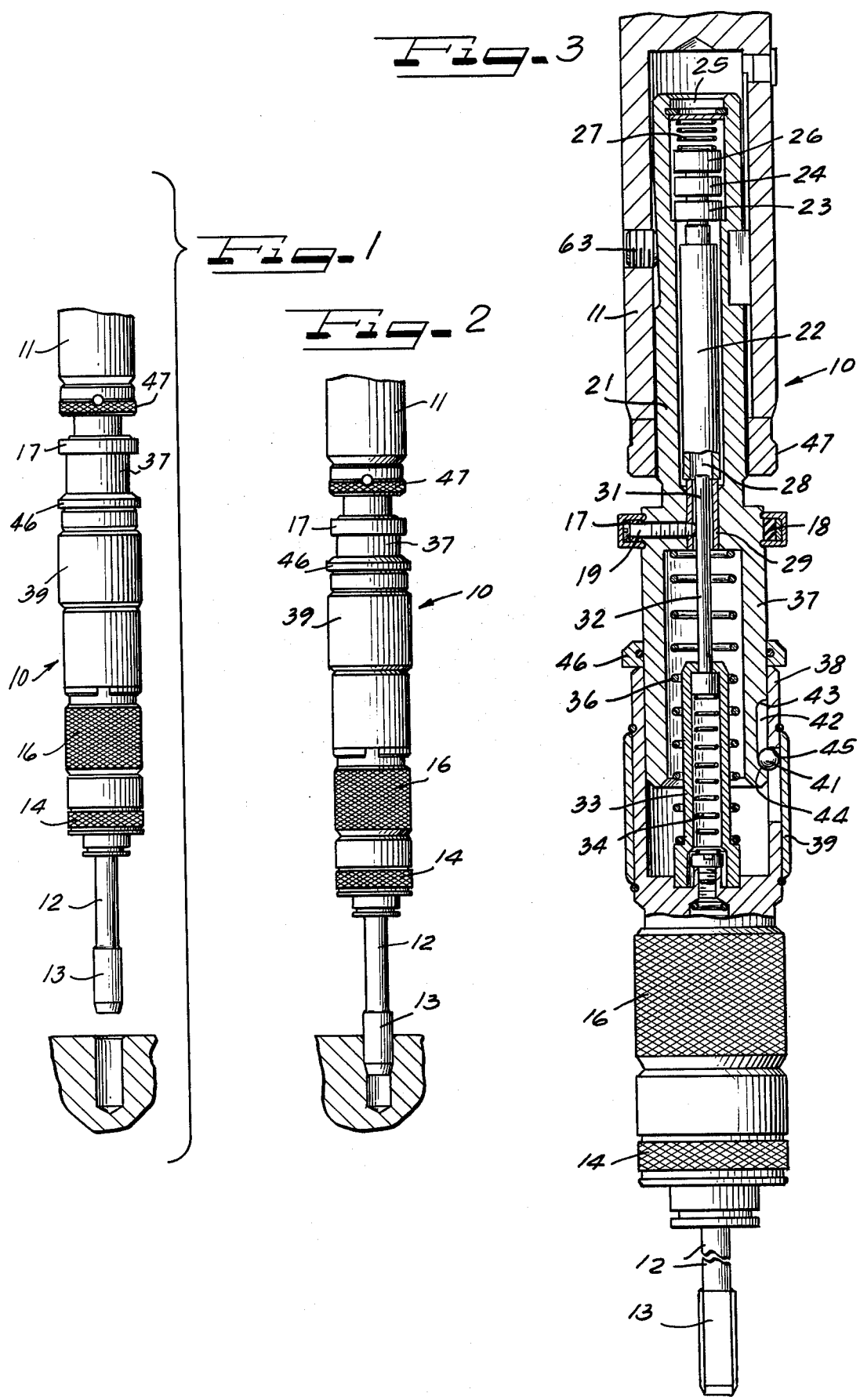

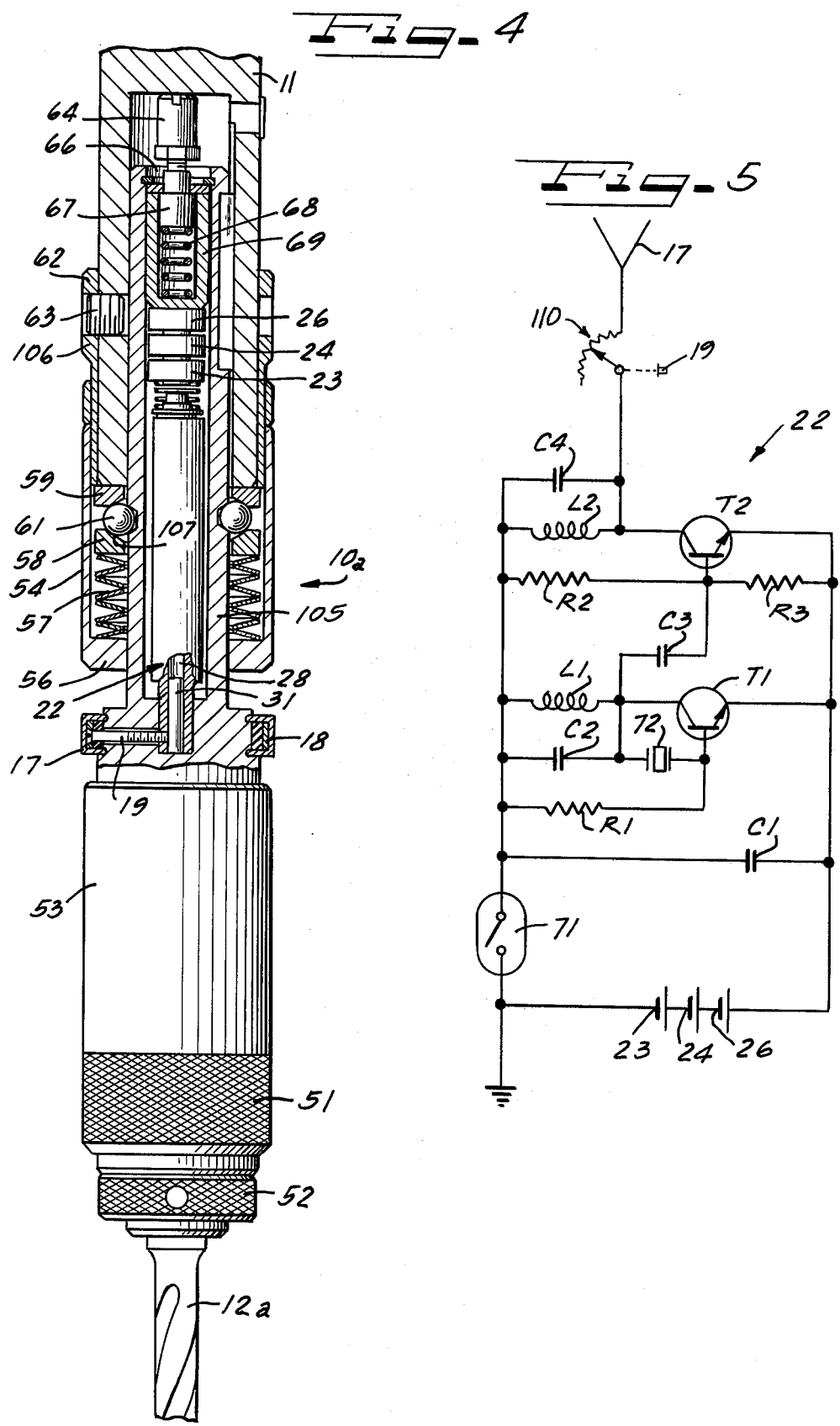

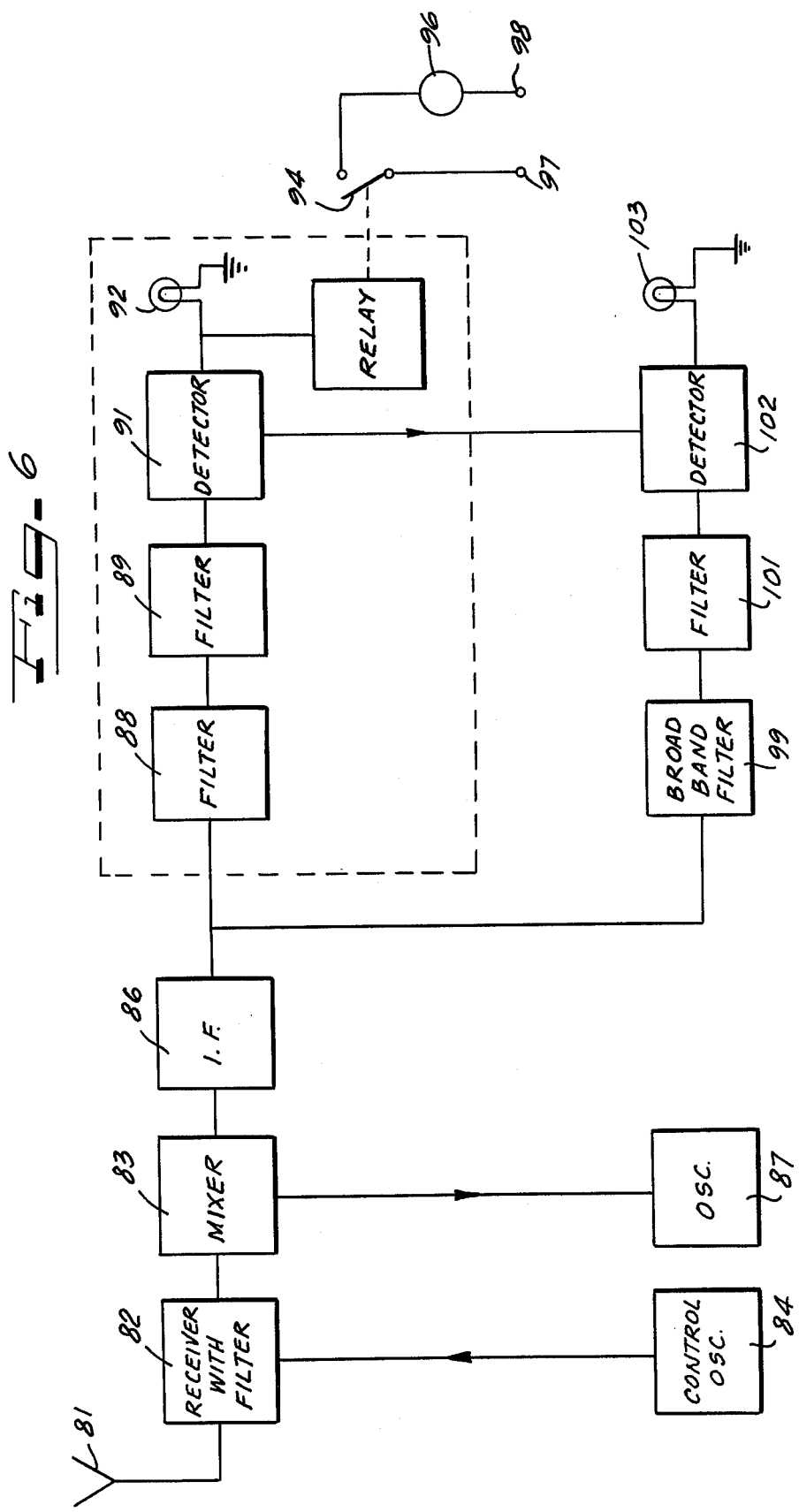

RADIO DETECTOR FOR DETECTING DULL AND BROKEN TOOLS

BACKGROUND OF THE INVENTION

1. Field of the Invention

This invention relates in general to drilling chuck devices and in particular to a safety clutch and transmitter and receiver combination so as to indicate and/or stop the tool when it is dull or broken.

2. Description of the Prior Art

My prior U.S. Pat. No. 3,723,017 which was issued on Mar. 27, 1973 discloses a chuck unit with a safety clutch which under overload conditions causes the clutch to be energized shortening the tool support and providing protection for the tool and workpiece.

SUMMARY OF THE INVENTION

In thread cutting, drilling, reaming, tapping and other tool operations at times the tool breaks or becomes dull which causes substantial increase in the axial compression loading on the tool, the workpiece and the machine which can break the tool, the workpiece or even the machine, thus resulting in costly losses.

The present invention utilizes a drilling chuck such as described in U.S. Pat. No. 3,723,017 wherein a clutch is overridden when the drill is overloaded and further includes the modification including a transmitter mounted in the tool holding member which is energized upon actuation of the clutch resulting from an overload, as for example, by a magnet which moves relative to the transmitter and energizes a reed switch so as to energize the transmitter to radiate a radio frequency signal that can be detected by a receiver remotely mounted from the tool so as to present an audio, optical display or warning or can actually turn the machine off so that damage will not occur to the tool, the workpiece or the machine.

A number of machines may utilize the invention with a different high frequency transmitter associated with each machine. All of the transmitters of a particular station may operate on the same frequency and a visual ring can be located on the chuck shaft which during overload will move to a position indicative of the overload. A single channel plug-in transmitter unit may be used for each spindle head or a single receiver can be utilized with such systems and the operator can visually determine which of the units has been overloaded.

A modification can be provided wherein each tool utilizes a high frequency transmitter which radiates on different frequencies from the other transmitters. A receiver tuned to the radiating frequencies of the respective transmitters is required for each channel and the overloaded tool can be recognized by the indication given by the receiver associated with a particular tool.

The safety system and checking device of the present invention can also be installed in existing machines having slide feed and this can be accomplished by merely exchanging the conventional chucks for thread cutting or drilling quick change chucks according to this invention with transmitters.

In the present invention, the movement required during overload to actuate the transmitter is adjustable and should be at least 0.5mm.

Maintenance of the transmitters of the invention merely requires replacement of batteries as, for example, once per year.

The receiving antenna can be mounted outside of the work region of a distance of about 3 meters. It is also possible to connect several antennas to a high frequency receiver. The total length of these antenna feed line should not exceed 25 meters. In the high frequency receiver, there is provided a wide band amplifier with a minimum display such as trouble lamps or an audible alarm and if a warning light or sounder is energized this means 1) the reception conditions are unfavorable and the distance between the antenna and chuck must be decreased, 2) the batteries of the transmitter in the chuck unit have become weak and must be replaced. Generally, the receiver electronics are maintenance free.

The advantages of the present invention is that even with short axial movements during overload of the spindle as many spindles as desired can be monitored.

Electrical feed lines to the individual spindles are not required since the transmitter is battery operated.

Chips, dust, water used in cutting and the like do not cause an erroneous message.

Other radio installations, as for example, personnel locator systems, radio telephone devices and the like do not cause interference or erroneous messages. Existing equipment can be easily updated by installing the radio transmitters and receivers of the invention with minimum cost. Due to the low radiated energy, FCC licenses are not required.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a side plan view of the invention in the normal operating condition;

FIG. 2 is a side view of the invention wherein an overload has occurred;

FIG. 3 is a partial sectional view of the invention under conditions when an overload has not occurred;

FIG. 4 is a sectional view of a modification of the invention;

FIG. 5 illustrates a transmitter of the invention; and

FIG. 6 illustrates a receiver useable with the invention.

DESCRIPTION OF THE PREFERRED EMBODIMENTS

FIGS. 1, 2 and 3 illustrate the protective device of the invention 10 installed in a tool chuck 11 with a tool shaft 12 carrying a cutting or threading tool 13 at its end mounted in the chuck 14 of the invention. By rotating the portion 39, the clutching release torque can be adjusted as described in U.S. Pat. No. 3,723,017. The drilling or boring machine has a sleeve 11 with a set screw 63 for clamping the hollow shank 21 of the tool holder of the invention therein. Within the shank or sleeve 21 is mounted a transmitter 22 of the invention which is electrically connected to batteries 23, 24 and 26 which are pressed by spring 27 and cap 25 threadedly received in the member 21 against the transmitter power input terminals. A shaft 32 extends through a sleeve 29 and carries a magnet 31 at its end adjacent the transmitter 22 which is receivable in a recess 28 of the transmitter 22. A spring 36 is mounted in a portion 37 of the member 21 and bears against a collar on a member 33 connected to the member 39. A ball 41 is mounted in a groove 42 of the portion 37 and lies between the shoulders 43 and 44 and 45 such that when the torque on the tool 13 exceeds the setting of the clutch as determined by the spring compression of the spring 36 the member 39 moves to the right relative to FIG. 3 until the ball engages the shoulder 43 in the member 37. When this occurs, the magnet 31 is moved up relative to FIG. 3 such that the magnet 31 energizes the magnetic responsive switch 71 which might be a reed switch illustrated in FIG. 5 so as to energize the transmitter 22.

An antenna 17 is mounted to the member 21 and is electrically connected by a suitable lead to the output of the transmitter 22 so as to radiate the high frequency signal generated by the transmitter 22 when the transmitter is energized. A sight ring 46 is mounted on the member 39 and when the clutch has been energized by overload moves toward the antenna 17 so as to indicate visually that overload has occurred.

FIG. 1 illustrates the invention 10 wherein overload has not occurred and the sight ring 46 is based a substantial distance from the antenna ring 47. When overload occurs, the member 39 moves up relative to the member 37 and FIG. 2 illustrates this condition wherein the sight ring 46 has moved toward the antenna 47.

The antenna 17 is insulated from the member 37 by installation 18 and an adjusting screw 19 can be mounted therein as shown in sectional view 3.

FIG. 4 illustrates a modification of the invention wherein the clutching arrangement differs from that illustrated in FIG. 3 and wherein the tool holder 10a of the invention is mounted in the machine chuck 11 by a set screw 63 which passes through a sleeve 106. A slidable sleeve 105 is mounted within the hollow confines of the member 11 and has a notch 107 in which a plurality of balls 61 are received. Spring 57 holds a tapered block 58 against the balls 61 and a tapered block 59 connected to member 106 engages the other side of the ball. When the tool 12a is overloaded by axial load the sleeve 105 moves up relative to FIG. 4 within the confines of the member 11 thus camming the balls 61 outwardly and compressing the spring 57 illustrating the overload condition. When this happens, a magnet 31 carried by the sleeve 105 moves into a depression 28 in the transmitter 22 so as to actuate the transmit switch of the transmitter 22 which is connected to the antenna 17.

FIG. 5 is the schematic illustration of the transmitter 22 and illustrates the magnetic responsive switch 71 which may be a reed switch which has one side grounded and connected to the negative terminals of the series connected batteries 23, 24 and 26. The other side of the switch 71 is connected to a capacitor C1 which has its other side connected to the positive terminal of the series connected batteries. A transistor T1 has its base connected to the switch 71 through the resistor R1. A crystal 72 is connected between the base and collector of the transistor T1 and a parallel circuit comprising a capacitor C2 and the inductance L1 is connected between the collector and the switch 71. The emitter of transistor T1 is connected to the positive terminal of the battery 26. A transistor T2 has its base connected to the collector of transistor T1 through the capacitor C3, and a resistor R3 is connected between the base and emitter of the transistor T2. The emitter of transistor T2 is also connected to the positive terminal of the battery 26. The base of transistor T2 is connected to the switch 71 through the resistor R2. An inductor L2 and capacitor C4 are connected between the collector of transistor T2 and the switch 71. The antenna 17 is connected to the collector of transistor T2 through a potentiometer 110.

When the switch 71 is closed by a movement of the magnet 31 into the opening 28 indicating an overload of the tool, the transmitter will radiate from the antenna 17, an output signal. In particular, transmitters constructed according to the invention, for example, such radiation might be in the range of 70 to 72 MHz.

FIG. 6 illustrates a receiver comprising an antenna 81 with an RF section 82 with mixer and filler which receives an input from a control oscillator 84. The output of the receiver 82 is supplied to a mixer 83 which receives an input from an oscillator 87 and supplies an output to an IF 86. A broad band filter 99 receives the output of the IF 86 and supplies an output to a filter 101 which supplies an input to a detector 102 which is connected to an indicator such as a light 103. Instead of the indicator 103 an audible warning device may be provided.

A narrow band filter 88 may also receive the output of the IF 86 and supply an input to a filter 89 which supplies an output to a detector 91 connected to an indicator 92 and to a relay 93 for energizing a switch 94 to control the drive motor 96 by disconnecting power therefrom which is applied to power terminals 98 and 97.

If all of the transmitters for a number of tools are operating at the same frequency, the indicator 103 can be utilized to indicate that one of the tools is overloaded and the operator can notice by observing the position of the sight ring 46 relative to the antenna 47 which of the particular monitored tools is overloaded and can stop such machine and replace the tool or make the necessary corrections.

If on the other hand the transmitters for each tool have an assigned narrow band frequency, a plurality of narrow band detectors such as the filters 88, 89 and detector 91 can be selected so as to be tuned to receive the particular signal from a particular transmitter so as to indicate with the indicator 92 and/or control with the relay 93 power to the drive motor of the particular machine.

The set screw 19 may be attached to potentiometer 110 so as to vary the gain of the antenna 17 and, thus, by removing a cap the attenuation of the antenna signal can be actuated so as to increase or decrease the radiated energy from the transmitter 22.

In the prior art it has been necessary to examine the bore hole depth by means of a special checking device or else to examine for tap drill breakage. The expenditures for such checking devices is considerable. The present invention automatically detects overload which indicates dullness and other conditions which can injure the workpiece, the tool or the machine and automatically actuates the overload clutch and transmits a signal to the receiving station to indicate to the operator that the tool has been overloaded such that corrective measures can be accomplished.

After the dull drilling tool has been changed by the operator, the coupling of the drilling chuck to the tool is accomplished by pulling downwardly on the tool so as to re-engage the clutch in the actuated position. This terminates energization of the transmitter 22 in that the magnet 19 in the embodiment illustrated in FIG. 3 or the magnet 31 in the embodiment illustrated in FIG. 4 would move out of the depression 28 thus allowing the magnetic responsive switch 71 to open which de-energizes the transmitter.

It is seen that this invention provides a novel safety device and although it has been described with respect to preferred embodiments it is not to be so limited as changes and modifications can be made therein which are within the full intended scope as defined by the appended claims.

I claim as my invention:

1. A device for preventing overload of an axially loaded tool comprising, a tool supporting member for receiving a tool in one end and adapted to be received into a motor driven chuck at its other end, said tool supporting member formed of first and second parts, an overload clutch mounted between said first and second parts such that when overload occurs said first and second parts move toward each other to shorten said tool supporting member, a radiant energy transmitter connected to said tool supporting member and actuated when said first and second parts move toward each other, and wherein said tool supporting member is hollow and said transmitter is mounted therein, and an antenna mounted to said tool supporting member and electrically connected to said transmitter.

2. A device for preventing overload according to claim 1 wherein said transmitter is supported within said first part, a switching means connected to said transmitter, and said switching means actuated when said first and second parts move toward each other during overload conditions.

3. A device for preventing overload according to claim 2, wherein said switching means includes a magnetically operated switch connected to said transmitter and a magnet connected to said second part and moveable to actuate said magnetically operated switch during overload conditions.

4. A device for preventing overload according to claim 3, wherein said magnetically operated switch is a reed switch.

5. A device for preventing overload according to claim 4 including a potentiometer mounted between the output of said transmitter and said antenna.

6. A device for preventing overload according to claim 1 including a radiant energy receiver mounted so as to receive and detect radiant energy radiated from said transmitter and including output means responsive to radiant energy from said transmitter.

7. A device for preventing overload according to claim 6 wherein said output means is an indicator.

8. A device for preventing overload according to claim 6, wherein said output means is connected to control the motor of said motor driven chuck to stop said chuck when overload occurs.

9. A device for preventing overload of an axially loaded tool comprising, a first tool supporting member for receiving a tool in one end and adapted to be received into a motor driven chuck at its other end, said first tool supporting member formed of first and second parts, an overload clutch mounted between said first and second parts such that when overload occurs said first and second parts move toward each other to shorten said tool supporting member, a radiant energy transmitter connected to said first tool supporting member and actuated when said first and second parts move toward each other, further including a plurality of additional tool supporting members each including tools, radiant energy transmitters and overload clutches which energize said transmitters during overload, receiving means for receiving radiation from said transmitters, and wherein certain of said transmitters radiate different signals and said receiver means includes portions responsive to said different signals to detect and respond to signals from particular transmitters.

10. A device according to claim 9, wherein more than one transmitter radiates energy at the same frequency and said receiver responsive to said frequency.

* * * * *